United States Patent
Walsh

(10) Patent No.: US 9,055,008 B1
(45) Date of Patent: *Jun. 9, 2015

(54) DEVICE AND PROCESS FOR EFFICIENT MULTICASTING

(75) Inventor: Hugh Walsh, Los Gatos, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 564 days.

This patent is subject to a terminal disclaimer.

(21) Appl. No.: 13/285,811

(22) Filed: Oct. 31, 2011

Related U.S. Application Data

(63) Continuation of application No. 11/868,949, filed on Oct. 8, 2007, now Pat. No. 8,050,263.

(60) Provisional application No. 60/829,077, filed on Oct. 11, 2006.

(51) Int. Cl.
  *H04L 12/28* (2006.01)
  *H04L 12/861* (2013.01)
  *H04L 12/935* (2013.01)
  *H04J 1/16* (2006.01)

(52) U.S. Cl.
  CPC .......... *H04L 49/90* (2013.01); *H04L 49/3027* (2013.01)

(58) Field of Classification Search
  CPC ....... H04L 47/52; H04L 49/90; H04L 49/103; H04L 49/3027
  USPC ......................................... 370/229, 390, 412
  See application file for complete search history.

(56) References Cited

U.S. PATENT DOCUMENTS

| | | | |
|---|---|---|---|
| 6,272,134 B1* | 8/2001 | Bass et al. ..................... 370/390 |
| 6,535,489 B1 | 3/2003 | Merchant et al. |
| 7,035,273 B1 | 4/2006 | Pannell et al. |
| 7,502,366 B1 | 3/2009 | Erimli et al. |
| 2006/0187949 A1* | 8/2006 | Seshan et al. ................. 370/412 |
| 2006/0259572 A1 | 11/2006 | Brown |

* cited by examiner

*Primary Examiner* — John Pezzlo

(57) ABSTRACT

A method and apparatus for allocating pointers in a network switch managing a multicast transmission includes receiving a frame in the switch and assigning pointers in an ingress module to buffer the frame, forwarding pointers along with a header including an egress variable indicative of a number of transmissions in the multicast transmission to an egress module for transmission of the frame, forwarding the egress variable after transmission of the frame to a multicast module, monitoring the transmission of the frame based upon the egress variable, and returning pointers to a free list responsive to the monitoring step and a value of the egress variable.

16 Claims, 5 Drawing Sheets

DEVICE AND PROCESS FOR EFFICIENT MULTICASTING

CROSS-REFERENCE TO RELATED APPLICATIONS

This application is a continuation of U.S. patent application Ser. No. 11/868,949 filed on Oct. 8, 2007, which claims priority under 35 U.S.C. §119(e) to provisional U.S. Patent Application No. 60/829,077, filed on Oct. 11, 2006, the disclosure of which is expressly incorporated by reference herein in its entirety.

BACKGROUND OF THE INVENTION

1. Field of the Invention

The invention relates generally to data communications with a network switch, and, more particularly, to implementing multicasting within a network switch.

2. Related Art

The rapidly increasing popularity of networks such as the Internet has spurred the demand for network services. In order to meet the demand for the increased network services, it has been found that increasing the size of frames typically increases the through-put of a network and therefore meets the increased demand.

The prior art networks typically used a 1518 byte frame size that was designed to protect against the high error rate of physical-layer Ethernet components. However, computer processing power has increased by an order of magnitude, and moreover the use of switched Ethernet over various media has significantly reduced errors. With these reduced errors, larger frame sizes may now be used with greater success.

Increasing the frame size typically reduces server overhead, increases throughput and the like, and has become an attractive option. However, typical switches have experienced a number of problems handling the larger frame size, for example, during multicast transmissions. In particular, as described in further detail below, the increased frame size results in an increased number of pointers for each frame that must be handled by multiple ports associated with the multicast transmission. The increased number of frames in conjunction with the increased transmissions with multicasting creates a bottleneck in handling pointers that decreases efficiency and speed.

FIG. 1 schematically shows a conventional network 100 in which a known network switch 102 connects devices 104A-104N and 112A-112N. Each of the devices 104A-N, 112A-N can be any network device, such as a computer, a printer, another network switch, or the like. Switch 102 transfers data between the devices 104A-N, 112A-N over channels 106A-N and 114A-N. The channels 106A-N and 112A-N can include fiber optic links, wireline links, wireless links, and the like.

In the typical known network switch 102, a queue controller 122 manages and assigns pointers to a buffer 108. The buffer 108 typically stores frame data received from any one of the devices 104A-N and 112A-N. A typical frame has its data fragmented into many discontinuous portions in the buffer 108. The queue controller 122 then typically organizes these portions with lists of pointers and forwards these lists from ingress of frames to egress of frames through ports of ingress modules 134A-N (ingress) and egress modules 136A-N (egress).

Accordingly, as frames are received in the switch 102, they are stored in the buffer 108. The location of the frames in the buffer 108 is based upon the pointers as is well known in the art. The process becomes more difficult with large frames. For example, a large frame size implementation may need 20 pointers per port, and utilizing fragmented 128 byte buffers would require 80 pointers per port. This results in increased cost and complexity for the memory and the switch. In previous designs, the typical switch had 256 total pointers, and a frame consisted of up to 3-4 pointers.

This conventional process is even more difficult and complicated with larger frames and multicasting. The queue controller 122 typically includes a multicasting module 124 for multicasting operations. Multicasting can include the transmission of a single frame from one or more ports. Thus, a pointer can be used by multiple ports. The multicasting module 124 typically controls when egressed buffer pointers may be returned to the free list 126. Some prior art implementations use a counter variable that indicates how many output queues the pointer remains waiting for transmission. When a pointer egresses a port, the multicasting module 124 decrements this counter variable. When the counter variable reaches 0, the multicasting module 124 returns all of the frame's pointers to the free list 126.

Another prior art queue controller implementation may use a memory more optimally by returning pointers to the free list 126 when all of the destination output queues have been successfully egressed a memory portion associated with a pointer. Other architectures may wait for the whole frame to egress all of the destination output queues, and thereafter return all of the frame's pointers at once. To implement the various control schemes, each pointer in a frame must maintain a variable indicating which or how many ports the pointer has been enqueued to and not yet egressed.

A further known implementation uses a bit vector, the bit vector value indicates that the pointer in a corresponding port's output queue should transmit a frame. When a pointer egresses from a particular port, the multicasting module 124 clears the corresponding bit in the vector (sets the bit=0). When the bit vector has all values equal to 0, the pointer is returned to the free list 126. In each of the above noted cases, the variables and/or vectors are stored in a memory. The memory is typically the memory in the multicast module. The variables and memory are accessed as follows.

Initially, a reserve list 128 typically builds a link list for a frame as pointers are provided to the ingress. The ingress receives a frame along one of channels 106A through 106N. When frame reception ends, ingress and the queue controller 122 and its associated reserve list 128 then forwards the frame to one or more output priority queues as indicated by a bit vector destination port vector (hereinafter "DPV").

Thereafter, a forwarding module typically enqueues the frame to all of the various destination output priority queues. The forwarding module then typically must write the DPV field to the multicasting module 124 memory for each pointer in the frame as schematically shown in FIG. 1.

When an output queue and its associated egress module successfully transmits the frame data in the buffer 108 addressed by the pointer, the output queue dequeues the pointer to the multicasting module 124.

Thereafter the multicasting module 124 reads the DPV field from the multicasting module 124 memory entry addressed by the pointer. The multicasting module 124 then typically clears the appropriate bit to 0. Subsequently, the multicasting module 124 writes a new DPV value to the multicasting module 124 memory entry addressed by the pointer. If the new DPV value is all zeros, the multicasting module 124 returns the pointer to the free list 126.

When using jumbo frames, the switch must fragment a frame into F buffers (F being an integer number). In order to store the frame into F buffers, the switch must perform F DPV writes per frame. For an implementation with N ports in a switch, the switch requires N times F DPV writes in order to complete the multicast switching process (see FIG. 1). Moreover, in order to meet basic speed requirements, the switch must complete the N time F writes in less than a minimum frame size time. The result of this increased number of pointers due to the jumbo frame size quickly becomes a bottleneck in the switching process that involves multicasting due to the need to write the DPV value to memory N times F times.

More specifically this prior art approach is highly wasteful because there is only one DPV value per frame, and the forwarding module writes this same value F times for each pointer in the frame.

Accordingly, there is a need for a network switch that provides for more efficient multicasting capability than that currently realized when using larger size frames and/or multicasting.

SUMMARY OF THE INVENTION

The invention provides a method and apparatus that allows for efficient multicasting of large frames and that furthermore includes other advantages apparent from the discussion herein. Embodiments of the invention provide for more efficient multicasting in typical data transfer processes with little or no change to existing architecture by tracking transmission of multicast frames in a different manner than currently employed in the art. The typical transfer process involves forwarding a pointer to egress or the like. Using the inventive process, no time-consuming processes have to be implemented in order to track the multicast transmission. Embodiments of the invention may be able to multicast a frame with 4, 20, 80 or more pointers with little impact on speed and area.

The invention may be implemented in a number of ways. According to one aspect of the invention, a method of allocating pointers in a network switch managing a multicast transmission includes the steps of receiving a frame in the switch and assigning pointers in an ingress module to buffer the frame, forwarding pointers along with a header including an egress variable indicative of a number of transmissions in the multicast transmission to an egress module for transmission of the frame, forwarding the egress variable after transmission of the frame to a multicast module, monitoring the transmission of the frame based upon the egress variable, and returning pointers to a free list responsive to the monitoring step and a value of the egress variable.

The monitoring step may further include forwarding the egress variable to a multicast module to update a multicast memory. The step of returning pointers may include determining when the multicast transmission is complete responsive to the update to the multicast memory. The egress variable may include a tracking value. The tracking value may include one of a count and a destination port value. The destination port value may include a vector. The multicast transmission may include a transmission to a plurality of channels. The monitoring step may further include at least one of clearing the egress variable as needed and comparing the egress variable to expected values.

The step of forwarding the egress variable to the multicast module may occur only after transmission of the frame. The step of forwarding the egress variable to the multicast module may only occurs once per pointer per transmission. The step of forwarding the egress variable may include forwarding the egress variable from the egress module. The step of forwarding the egress variable may include forwarding the egress variable from the first of several egress modules used to transmit a multicast transmission, and may further include the step of storing the egress variable in the multicast module.

The egress module may be a vector having values representative of a number of transmission ports used in a given multicast transmission and the status of the transmission from each port, and the monitoring step may include checking the vector to determine the status of transmission from each transmission port.

According to another aspect of the invention, a machine-readable medium includes instructions, which, when executed by at least one switch cause network switching, the instructions including instructions for receiving a frame in the switch and assigning pointers in an ingress module to buffer the frame, instructions for forwarding pointers along with a header including an egress variable indicative of a number of transmissions in the multicast transmission to an egress module for transmission of the frame, instructions for forwarding the egress variable after transmission of the frame to a multicast module, instructions for monitoring the transmission of the frame based upon the egress variable, and instructions for returning pointers to a free list responsive to the value of the egress variable.

According to yet another aspect of the invention, a circuit allocating pointers in a network switch managing a multicast transmission includes a storage to buffer a frame of a multicast transmission, an ingress module to receive the frame in the switch and to assign pointers to buffer the frame, an egress module to transmit the frame, a controller to forward pointers each having a header including an egress variable indicative of a number of transmissions in the multicast transmission to the egress module to transmit the frame, the egress module configured to return pointers along with the egress variable after indicative of a number of transmissions in the multicast transmission of the frame, and a block module to monitor the transmission of the frame based upon the egress variable and to return pointers to a free list responsive to the egress variable.

The apparatus may further include a header memory configured to store the header including the egress variable. The egress variable may include a tracking value. The tracking value may include one of a count and a destination port value. The destination port value may include a vector. The egress module may returns the egress variable once per pointer per transmission.

According to yet another aspect of the invention, an apparatus allocating pointers in a network switch managing a multicast transmission includes means for storing a frame for a multicast transmission, means for receiving the frame in the switch and to assigning pointers to store the frame, means for transmitting the frame, means for forwarding pointers, each having a header including an egress variable indicative of a number of transmissions in the multicast transmission to the transmitting means to transmit the frame, the transmitting means returns pointers along with the egress variable after transmission of the frame, and means for monitoring the transmission of the frame with the egress variable and to return pointers to a free list responsive to the egress variable.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
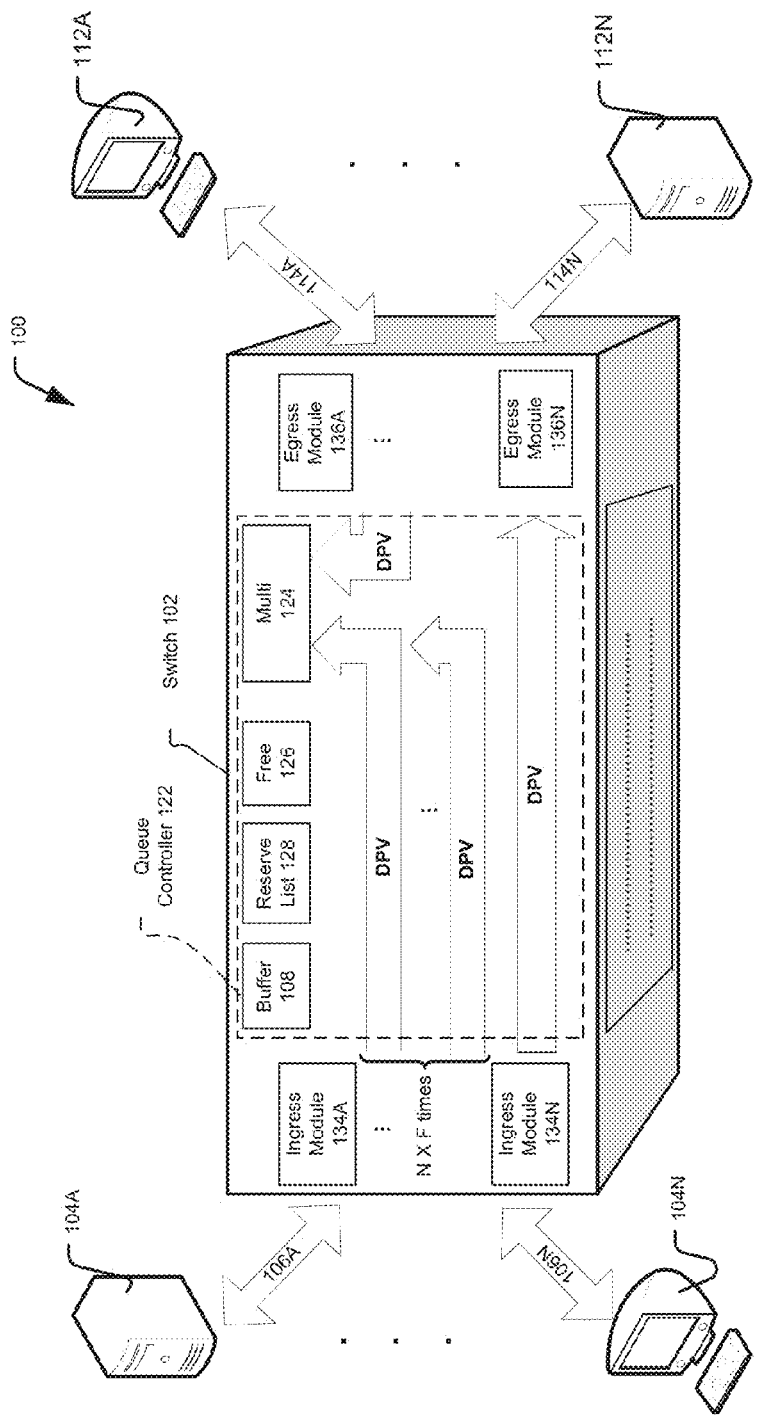
FIG. 1 schematically shows a conventional network in which a known network switch multicasts to one or more devices by writing the DPV value to memory N times F times.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figure 2:
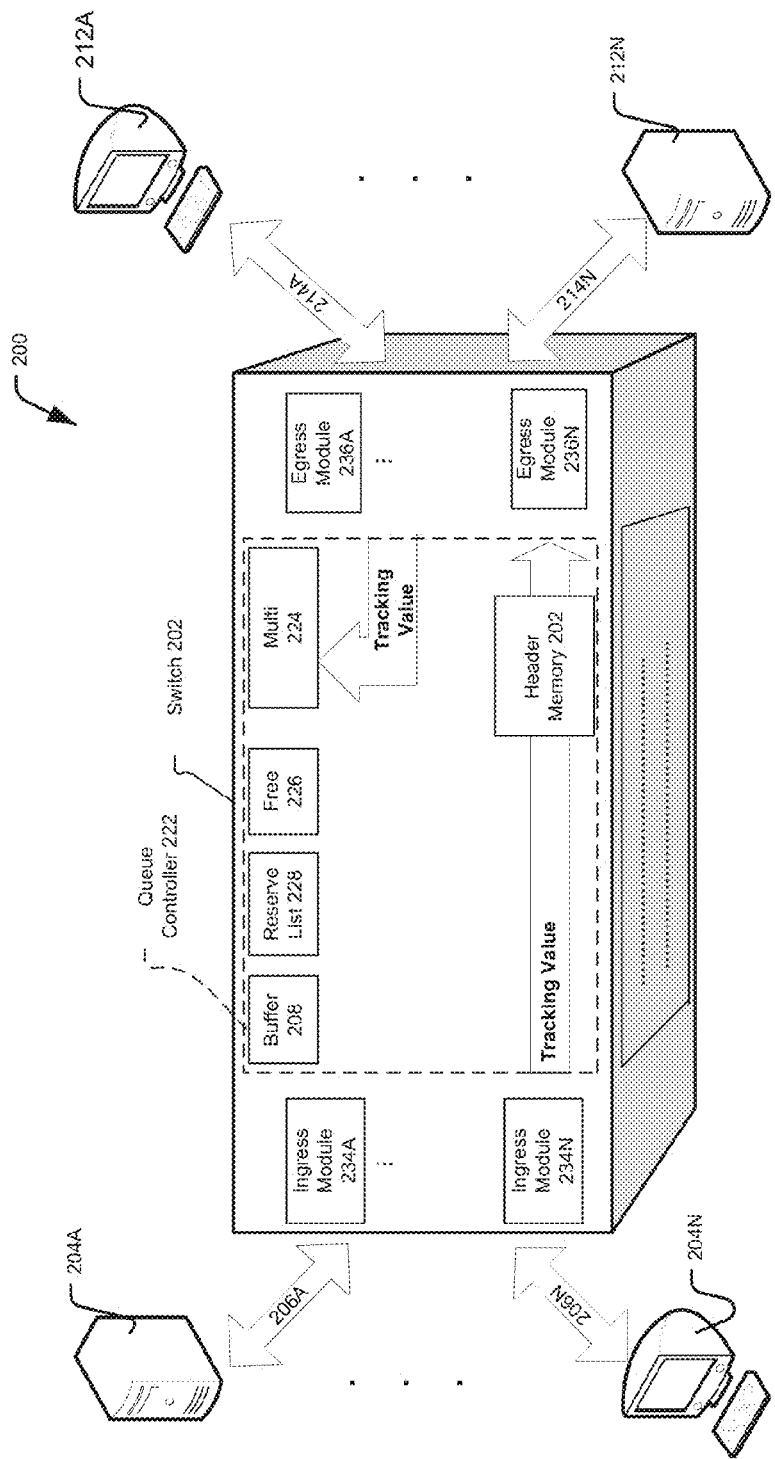
FIG. 2 is a block diagram of a network switch using a data transfer process according to the principles of the invention to achieve more efficient multicasting.

FIG. 2 is a block diagram of a network 200 with a network switch 202 using a data transfer process according to the principles of the invention to achieve more efficient multicasting. More specifically, the switch 202 includes a buffer 208 to hold the data received from frames that are received in ingress modules 234A-N (ingress) and egress modules 236A-N (egress) as is well known in the art. A header memory 204 may operate to store destination byte size, LAN identification, and the like, as is known in the art. The header memory 204 may also be used for other capabilities within the network switch and/or using some other internal data exchange already existing within the switch according to the process described in further detail below with respect to FIG. 3, to more efficiently store, track, and/or exchange data for tracking multicasting frames. In particular, the header memory 204 contains select information, to more efficiently process and track the pointers during a multicasting process. It should be noted that other memories in switch 200 may also be used. A particular implementation of such a tracking process of the invention is described with reference to FIG. 3.

Figure 3:
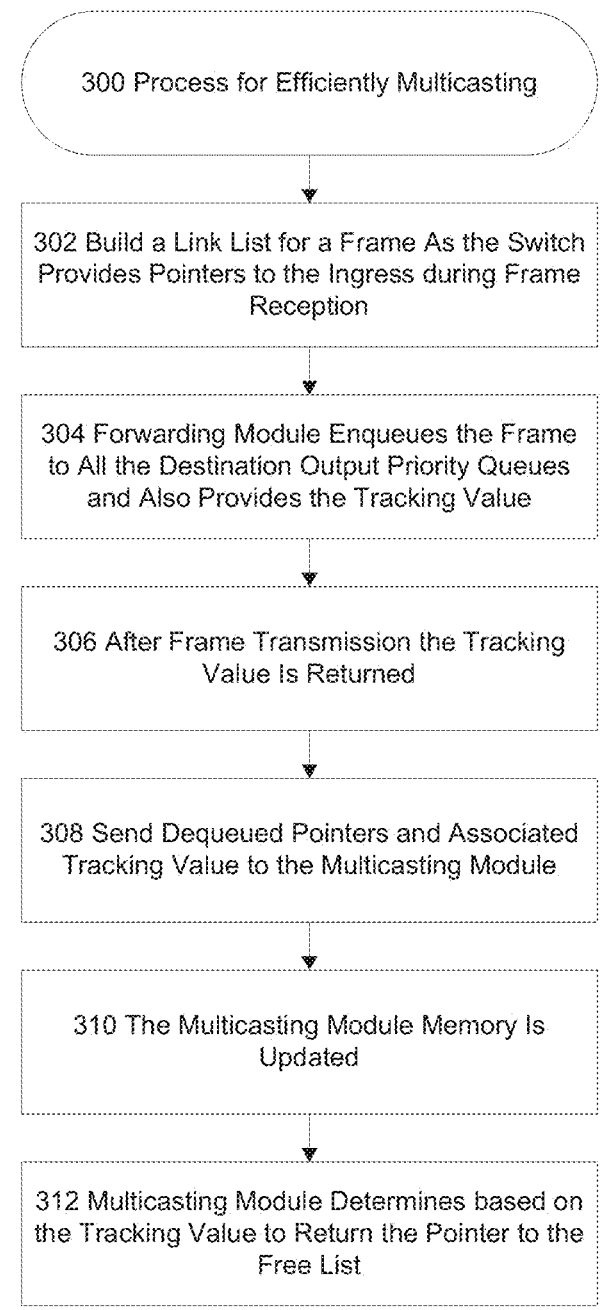
FIG. 3 is a flowchart of a process for efficiently multicasting according to the principles of the invention.

FIG. 3 is a flowchart of a process for efficiently multicasting according to the principles of the invention. In particular, FIG. 3 shows a process 300 for efficiently multicasting by relying on memory and/or a process already in place and operating in a typical network switch.

In an exemplary operation, a reserve list may build a link list for a frame as the switch provides pointers to the ingress during frame reception as is known in the art. When the frame reception ends, the ingress, the queue controller 222 and the reserve list 228 may then forward the frame to one or more output priority queues. For multicasting, the particular output priority queue is described by a tracking value such as a count value, a bit vector DPV, or the like. This process is shown in step 302 of FIG. 3.

In step 304, the forwarding module may then enqueue the frame to all the destination output priority queues. In this regard, the multicasting capability described herein, is directed to one or more ports outputting the frame that was received. The forwarding module may then write the frame tracking value to the header memory 204. The header memory 204 may be any type of memory, the contents thereof which are exchanged, processed, or the like during frame reception and/or transmission. In this aspect, the header memory 204 has one entry per frame that may be addressed at the time the frame's head pointer is addressed. In many switches, the memory addressed at the frame's head pointer exists in the architecture and thus may be used to store values like byte count, LAN identification, and so on which may be classified by ingress during reception of the frame.

As further shown in step 304, during the multicast transmission, when an output queue provides a pointer to the egress during transmission, the output queue may also provide the tracking value from the header memory 204. Accordingly, by providing the tracking value from the header memory 204 addressed by a pointer, there is little or no increase in processing time or additional steps. Of course any process where data is exchanged during the egress may also be used to carry the tracking value.

Next, during frame transmission, the egress does not use the tracking value for transmission. As set forth in step 306, when the egress dequeues the pointer, the egress sends back the associated tracking value therewith as set forth by step 306. Again, returning the associated tracking value is part of the normal operating (overhead) process of the switch 202.

In step 308, the output queue stores the dequeued pointers and their associated tracking value and sends the same to the multicasting module 224.

In step 310, the multicasting module memory is updated accordingly. Finally, once the multicasting module determines that the tracking value indicates transmission is complete for all egress modules, the multicasting module then may return the pointer to the free list 226 for use by an incoming frame as shown in step 312.

The multicasting module memory may have two entries MOD (modified) and the tracking value. The MOD entry refers to whether or not a particular tracking value has been modified. The MOD entry may be cleared to 0 before the first multicasting request arrives. There may be at least two methods to clear this entry. A first method is for the multicasting module 224 to read the memory entry addressed by the dequeued pointer. If the MOD value is found to be zero, then the multicasting module 224 uses the tracking value from the requesting output queue. Thereafter, the multicasting module 224 clears the associated bit to 0 and writes the new tracking value as well as writing a 1 to the MOD value. On the other hand, MOD may be 1. The multicasting module 224 may then use the tracking value from the memory, and modifies the correct bit and writes it back to memory. More specifically, the multicasting module uses the tracking value from the memory to update the bit indicating that a particular egress has transmitted a frame. Finally, once the multicasting module 224 determines that all the values for the value are 0 thereby indicating that all of the pointers from each ingress frame used for a multicasting transmission have been sent, the multicasting module then may return the pointer to the free list for use by an incoming frame as shown in step 312.

Accordingly, the process of the invention may use a memory that already exists, may be part of an existing the architecture, and/or may be used during an existing process of switching frames, such that there is little or no increase in the processing time for the exchange, writing, and so on that may form a bottleneck as in conventional switches.

The process of the invention eliminates the need for the forwarding module to write a frame's tracking value or the like to each pointer's entry in the multicasting memory. The only cost in implementing this process is the possible widening of the header memory by tracking value bits and possible widening of the queue controller-egress interface by the tracking value bits.

Further to the above-noted process 300, the switch 202 may further implement a process to ensure that there is no existence of false data in the header memory. In particular, at power on or during resets, the switch 202 may write zeros to each entry of the multicasting memory before allowing the queue controller to accept frames. When a queue controller multiblock determines that the modified tracking value is all zeros and the frame may be returned to the free list. Thereafter, the MOD field may be written to include zeros.

Another approach for operating the header memory 204 is to include an additional field called PTRID (PTRID stands for pointer identification). The PTRID value may be used for watch dog checking. When a pointer is dequeued by egress, the egress may provide its pointer identification. If this does not equal the pointer identification in the multicasting memory, the controller and the egress may be out of sync. Accordingly, a watch dog action then may be triggered in response to this out-of-sync situation. It is not desirable to have a forwarding module write the PTRID for each pointer in the frame. This would possibly cause a memory bottleneck and it may be desirable to avoid the same. Instead, the queue controller reserve list 228 may write the PTRID to the multicasting memory every time the free module provides a pointer to ingress. At the same time, the queue controller reserve list 228 may write a zero to the bit MOD.

Figure 4:
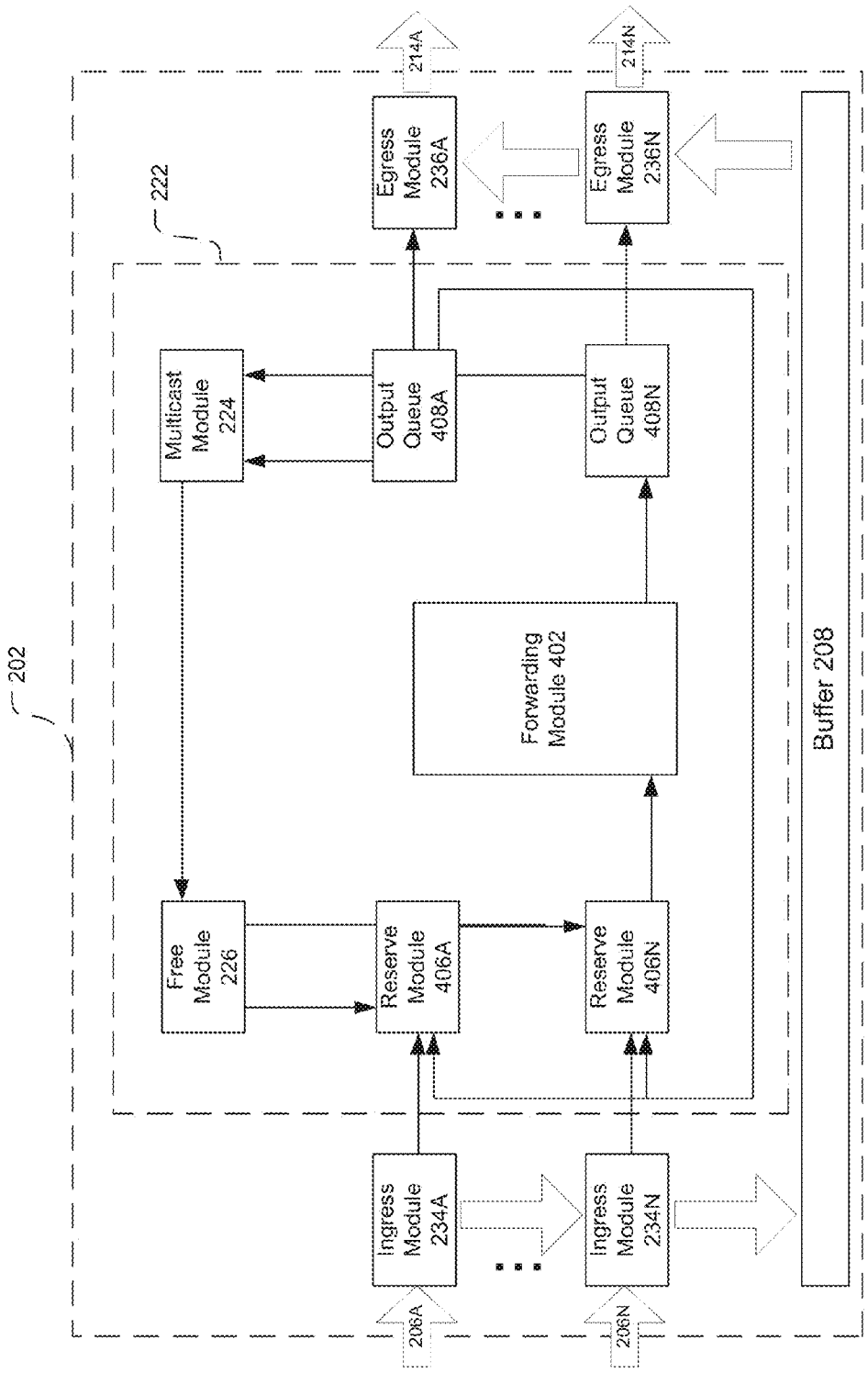
FIG. 4 is a block diagram showing the manner in which pointers circulate within the queue controller of FIG. 2.

FIG. 4 is a block diagram showing the manner in which pointers circulate within the queue controller of FIG. 2. In particular, FIG. 4 shows a shared-memory output-queue store-and-forward network switch implementation of switch 202 of FIG. 2. The switch of FIG. 4 has a plurality of ports. Each port may be connected to a channel 204A-N, a queue controller 222 and a buffer memory 208. Each port may include an ingress module 234 that may be connected to a channel 206 by a physical layer (PHY) and a media access controller (MAC). Further, referring to FIG. 4, a port may include an ingress module 234A that may be connected to channel 206A by a MAC and a PHY, while an ingress module 234N may be connected to channel 206N by a MAC and a PHY. The ingress receiving a frame is set forth in detail below. Each port may also include an egress module 236 that may be connected to a channel 206 by a MAC and a PHY. Further, referring to FIG. 4, a port may include an egress module 236A that may be connected to channel 214A by a MAC and a PHY, while the port includes an egress module 236N that is connected to channel 214N by a MAC and a PHY. The egress transmitting a frame is described in detail below.

Figure 5:
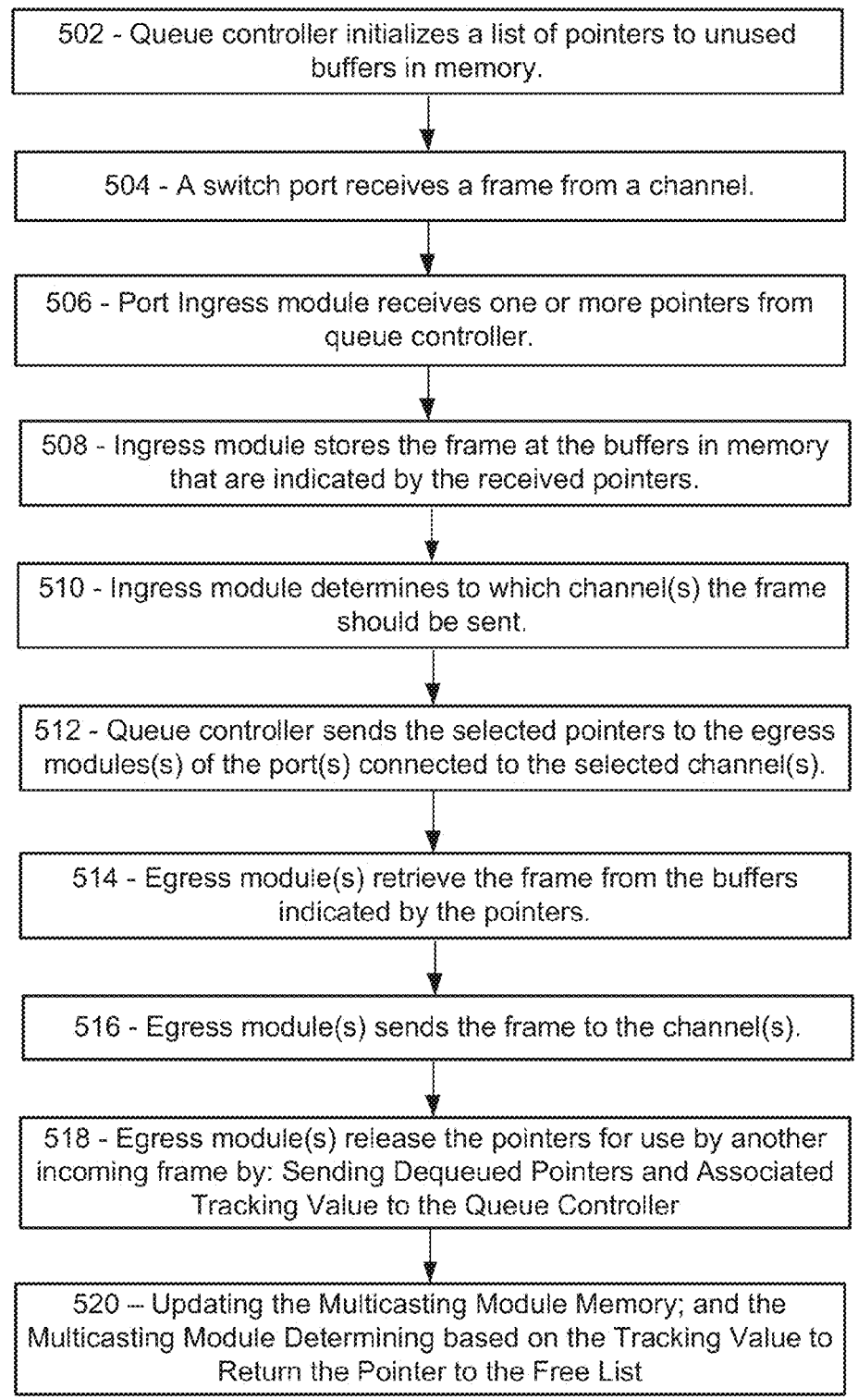
FIG. 5 is a flowchart that schematically illustrates the efficient multicasting process of FIG. 3 with further process steps used in operating the switch of FIG. 4.

FIG. 5 is a flowchart that schematically illustrates the efficient multicasting process of FIG. 3 with further process steps used in operating the switch of FIG. 4. At power-on, queue controller 222 initializes a list of pointers to unused buffers in memory 208 (step 502). A port of switch 202 receives a frame from a channel 206 (step 504). The frame enters the port connected to the channel 206 and traverses the PHY and MAC of the port to reach the ingress module 234 of the port. Ingress module 234 requests and receives one or more pointers from queue controller 222 (step 506). Ingress module 234 stores the frame in the buffers in memory 208 indicated by the received pointers (step 508).

Ingress module 234 then determines to which channel (or one or more channels in the case of a multicast operation) the frame should be sent, according to methods well-known in the art (step 510). Queue controller 222 sends the selected pointers to the egress modules 216 of the ports connected to the selected channels (step 512). These egress modules 216 then retrieve the frame from the buffers indicated by the pointers (step 514) and send the frame to their respective channels 204 (step 516). These egress modules 236 then release the pointers for use by another incoming frame in step 518 using process steps 306-312 of FIG. 3 described above. Then the queue controller 222 updates the multicasting module memory and returns the pointer to the free list 126 based on the tracking value (step 520). The operation of the switch 202 is termed "store-and-forward" because the frame is stored completely in the memory 208 before leaving the switch 202. Because all of the switch ports use the same memory 208, the architecture of switch 202 is termed "shared memory."

The queue controller 222 performs the switching operation by operating only on the pointers to memory 208. The queue controller 222 does not operate on the frames. If pointers to frames are sent to an egress module 236 faster than that egress module 236 can transmit the frames over its channel 204, the pointers are queued within that port's output queue 408. Because pointers accumulate only at the output side of switch 202, the architecture of switch 202 is also termed "output-queued." Thus switch 200 has a store-and-forward, shared-memory, output-queued architecture.

With reference to FIG. 4, the queue controller 222 may be implemented using hardware, software, or any combination thereof. The queue controller 222 may include a forwarding module 402, a free module 222, a plurality of reserve modules 406A through 406N, and a plurality of output queues 408A through 408N. Each reserve module 406 may be connected to one of the ingress modules 234. Each output queue 408 may be connected to one of the egress modules 236.

The free module 226 and reserve modules 406 each contain pointers to buffers in shared memory 208. Each output queue 408 may contain a priority queue for each class of service implemented by switch 202. Free module 222 may contain pointers to buffers in memory 208 that are available to store newly-received frames (that is, the buffers have an available status). Each reserve module 406 contains a list of pointers to available buffers that are reserved for the port housing for that reserve module. FIG. 4 depicts the manner in which these pointers circulate within queue controller 222. Queue controller 222 allocates pointers from the free module 226 to the reserve modules 406 according to the methods described above. Buffers associated with pointers in a free module 222 have an available status until a frame is stored in the buffers. Storing a frame in one or more buffers changes the status of those buffers to unavailable. To forward a frame to an output port, the frame may be stored in a buffer in memory 208, and the pointers to that buffer may be transferred to the output queue 408 for that output port. When a frame is sent from an output port to a channel, the pointers for that frame may be returned to the free module 222, thereby changing the status of the pointers to available. Multicast module 224 handles multicast operations as is well known in the art.

With reference to FIGS. 2-5, an example of the operation of the invention will now be described. When a frame is received along a channel 206, the frame may be received in the ingress module 234 and stored in buffer 208. As a part of the normal process of switching the frame, a header memory may store and/or process the frame byte size, LAN identification along with other various indicators. Additionally a tracking value may be generated and included with the other criteria and stored in header memory.

The tracking value may be a vector that lists the transmitting channels as ONES and the non-transmitting channels as ZEROES. The vector may list these channels in order from n to 1. This resultant vector for n ports may be:

{Port n, . . . Port 4, Port 3, Port 2, Port 1}

For example, a tracking value vector to transmit over channels one and three may be {0, . . . 0, 1, 0, 1}. The left most one indicating the third port will transmit a frame and the right most one indicating the first port will transmit a frame.

Thereafter during transmission of the frame from the first port the tracking value {0, . . . 0, 1, 0, 1} may be forwarded to the multicast module 224. The multicast module 224 may have a cleared memory of {0|, . . . 0, 0, 0, 0} as noted above. The first zero indicating that the MOD value has not been modified. Upon receiving the value of {0, . . . 0, 1, 0, 1} from the egress module indicating a transmission from channel one, the multicast module will replace the {0|0, . . . 0, 0, 0, 0} tracking value in its memory with {0|0, . . . 0, 1, 0, 1} which is the tracking value based on the fact that the MOD value in the multicast module 224 is a zero. Subsequently the multicast module 224 will replace the first zero with a one indicating that it has been modified as shown by {1|0, . . . 0, 1, 0, 1}. Thereafter multicast module will then replace the right most one with a zero indicating that the frame had been transmitted from channel one.

Accordingly, the multicast module memory will now have a value of {1|0, . . . 0, 1, 0, 0}. Thereafter when the frame is transmitted from the third channel, the tracking value {0, . . . 0, 1, 0, 1} will be forwarded again to the multicast module. The multicast module 224 will recognize that its stored tracking value vector {1|0, . . . 0, 1, 0, 0} has MOD=1. Thus, the multicast module 224 will only update the tracking value and not the whole vector as noted above. Thus, the tracking value of {0, . . . 0, 1, 0, 1} received from the third channel egress module will replace the third bit with a zero. Now the multicast module 224 has a value of {1|0, . . . 0, 0, 0, 0}. Thus, all bits other than the MOD value are zeros thus indicating that the multicast transmission has been completed by all of the channels including channel one and channel three. Accordingly, the multicast module 224 may now free the pointers for use in the free module 226.

Accordingly during this above noted example, the multicast module 222 did not receive a plurality of tracking value writes from the ingress module. Only the tracking value that was received from the egress module during the normal course of action and processing. Thus, this was a more efficient operation within the queue controller 222.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation as software programs running on a computer processor. Furthermore, alternative software implementations including, but not limited to, distributed processing, component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A network switch configured to manage a multicast transmission of a frame, the network switch comprising:
    a header memory;
    a plurality of output queues, each of the plurality of output queues being associated with a respective egress module of the network switch;
    a controller configured to
        i) store an egress variable in the header memory, wherein the egress variable is associated with the frame, and wherein the egress variable is indicative of a number of transmissions in the multicast transmission, and
        ii) provide the egress variable from the header memory to the plurality of output queues; and
    at least one egress module configured to i) transmit the frame from the network switch, and ii) after transmission of the frame, return the egress variable to the controller,
    wherein the controller is configured to update the egress variable stored in the header memory in response to the egress variable being returned from the at least one egress module.

2. The network switch of claim 1, wherein the egress variable is addressed by a pointer in the header memory.

3. The network switch of claim 1, wherein the egress variable includes a tracking value associated with at least one of the plurality of output queues.

4. The network switch of claim 3, wherein the tracking value includes a count value or a destination port value.

5. The network switch of claim 1, further comprising:
    a buffer configured to store the frame.

6. The network switch of claim 1, further comprising:
    at least one ingress module configured to i) receive the frame at the network switch, and ii) assign pointers to buffer the frame.

7. The network switch of claim 1, wherein:
    the controller is further configured indicate that transmission of the frame is complete based on the egress variable being returned from the at least one egress module.

8. The network switch of claim 1, wherein the egress variable includes a vector having i) values representative of a number of transmission ports used in the multicast transmission, and ii) a status of transmission from each of the transmission ports.

9. A method of managing a multicast transmission of a frame in a network switch, the method comprising:
- storing an egress variable associated with the frame in a header memory, the egress variable indicative of a number of transmissions in the multicast transmission;
- providing the egress variable from the header memory to output queues associated with respective egress modules of the network switch;
- transmitting the frame from the network switch from one of the respective egress modules;
- after transmission of the frame, returning the egress variable from the one of the respective egress modules; and
- updating the egress variable stored in the header memory in response to the egress variable being returned from the one of the respective egress modules.

10. The method of claim 9, wherein the egress variable is addressed by a pointer in the header memory.

11. The method of claim 9, wherein the egress variable includes a tracking value associated with at least one of the output queues.

12. The method of claim 11, wherein the tracking value includes at least one of a count value and a destination port value.

13. The method of claim 9, further comprising:
- storing the frame in a buffer.

14. The method of claim 9, further comprising:
- receiving the frame at the network switch using at least one ingress module; and
- assigning pointers to buffer the frame using the at least one ingress module.

15. The method of claim 9, further comprising:
- indicating that transmission of the frame is complete based on the egress variable being returned from the one of the respective egress modules.

16. The method of claim 9, wherein the egress variable includes a vector having i) values representative of a number of transmission ports used in the multicast transmission, and ii) a status of transmission from each of the transmission ports.

* * * * *